United States Patent
Grass et al.

(10) Patent No.: US 6,848,549 B2
(45) Date of Patent: Feb. 1, 2005

(54) METHOD AND APPARATUS FOR OPERATING AN AUTOMATED CHANGE-SPEED GEARBOX

(75) Inventors: Thomas Grass, Urbach (DE); Klaus Neft, Pluederhausen (DE); Anton Rink, Karlsruhe (DE); Joachim Schaefer, Welzheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/303,053

(22) Filed: Nov. 25, 2002

(65) Prior Publication Data

US 2003/0116393 A1 Jun. 26, 2003

(30) Foreign Application Priority Data

Nov. 24, 2001 (DE) .......................................... 101 57 711

(51) Int. Cl.$^7$ ...................... B60K 41/28; B60K 41/22; B60K 41/26
(52) U.S. Cl. ..................................... 192/3.63; 192/220
(58) Field of Search ............................... 192/3.63, 220, 192/220.1; 477/62, 63, 73, 74, 75, 94, 97, 107, 125, 171; 701/65, 71, 87; 303/115.2, 113.2

(56) References Cited

U.S. PATENT DOCUMENTS

| | | | | |
|---|---|---|---|---|
| 4,491,919 A | * | 1/1985 | Leiber ........................ 701/81 |
| 4,595,986 A | * | 6/1986 | Daubenspeck et al. ....... 477/78 |
| 4,676,353 A | * | 6/1987 | Matsuda .................... 192/13 R |
| 4,766,988 A | * | 8/1988 | Seibert ....................... 477/172 |
| 4,796,739 A | | 1/1989 | Jonner et al. |
| 4,825,989 A | * | 5/1989 | Frigger ..................... 192/13 R |
| 4,899,279 A | * | 2/1990 | Cote et al. ................... 477/94 |
| 4,913,270 A | * | 4/1990 | Ishido et al. ................ 192/221 |
| 4,934,497 A | * | 6/1990 | Ishizeki et al. ........... 192/13 R |
| 6,029,511 A | * | 2/2000 | Welsch et al. ................ 701/69 |

FOREIGN PATENT DOCUMENTS

| | | |
|---|---|---|
| DE | 36 30 750 A1 | 3/1988 |
| DE | 198 23 764 A1 | 12/1998 |
| JP | 60-135356 A * | 7/1985 |

* cited by examiner

Primary Examiner—Rodney H. Bonck
(74) Attorney, Agent, or Firm—Crowell & Moring LLP

(57) ABSTRACT

The invention relates to a method and an apparatus for operating an automated change-speed gearbox of a motor vehicle. The control device of the change-speed gearbox communicates via signals with a control unit of an anti-block control system. To allow particularly comforatable operation of the change-speed gearbox, the invention envisages that, as a function of signals from the control unit of the anti-lock control system, the change-speed gearbox is set to a neutral position, an appropriate gear ratio is determined and this gear ratio is engaged.

12 Claims, 3 Drawing Sheets

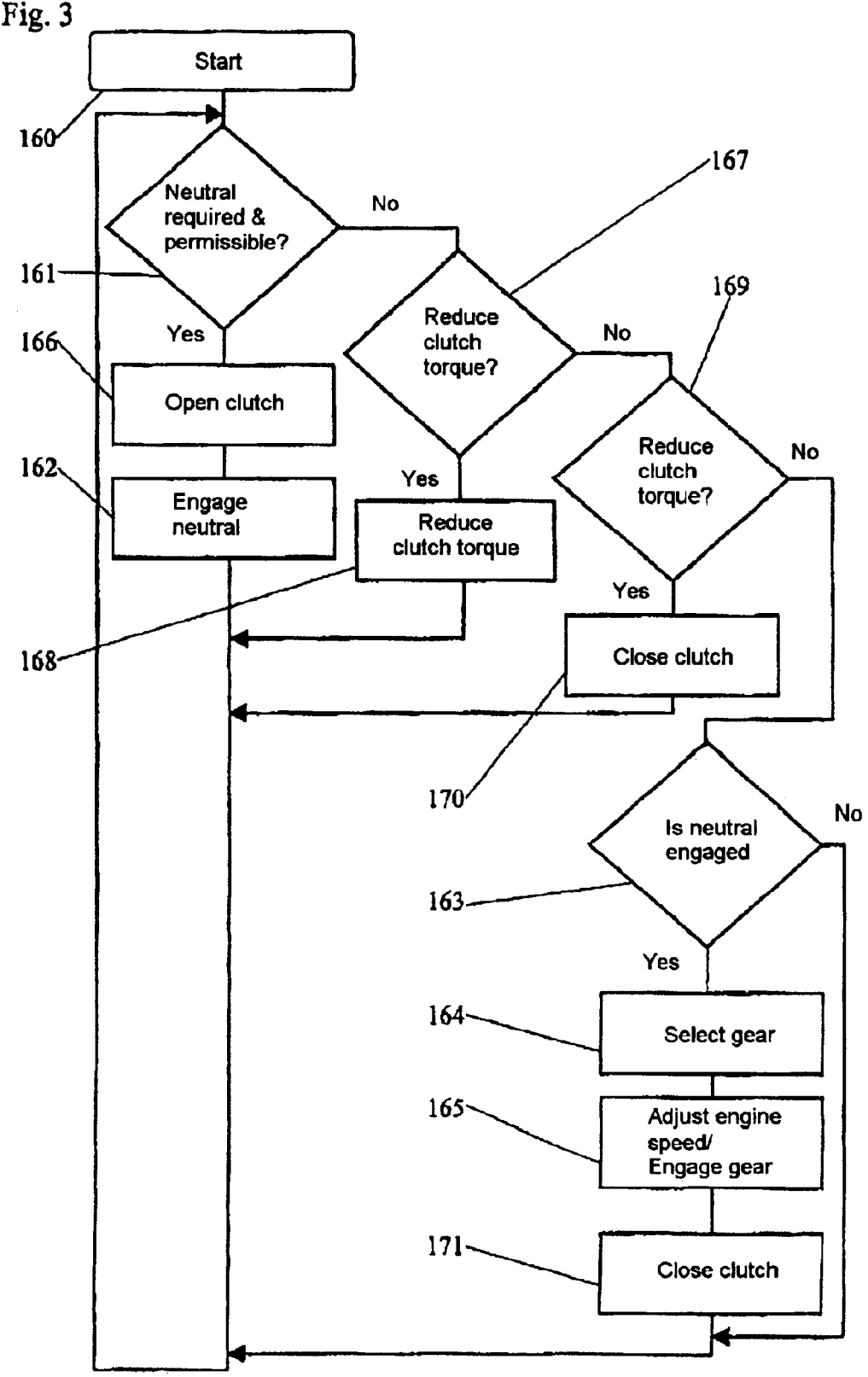

METHOD AND APPARATUS FOR OPERATING AN AUTOMATED CHANGE-SPEED GEARBOX

This application claims the priority of German Patent Document No. 101 57 711.7-14, filed Nov. 24, 2001, the disclosure of which is expressly incorporated by reference herein.

BACKGROUND AND SUMMARY OF THE INVENTION

The invention relates to a method and to an apparatus for operating an automated change-speed gearbox.

DE 198 23 764 A1 describes a method for controlling an automated clutch, which is included in the drive line of a motor vehicle, in conjunction with an automated gearbox. The automated clutch is controlled by an electronic control unit that evaluates the activation of an anti-lock control system (ABS), among other factors.

DE 36 30 750 A1 describes an apparatus for clutch actuation in conjunction with a manually actuated gearbox, in which a clutch arranged between the gearbox and a prime mover in the form of an engine or motor is opened when an anti-lock function of an anti-lock control system (ABS) is present. Once the anti-lock function has come to an end, the clutch is closed again. The selected gear in the gearbox can only be influenced by a driver of the vehicle.

Faced with the situation, it is an object of the invention to propose a method and apparatus for operating an automated change-speed gearbox which allows particularly comfortable operation of the change-speed gearbox.

According to the invention, the object is achieved by a method which is carried out by a control device, which controls actuators for actuating an automated clutch and for actuating gear-change elements. Selection of the gears can be performed by a driver of the vehicle by an operating device in a semi-automatic mode, or can be performed by the control device in a fully automatic mode. The control device communicates via signals with a control unit of an anti-lock control system. Via this signal link, the control unit sends signals on the current status of the anti-lock control system, such as whether the system is active, or sends requests to the automated change-speed gearbox, which are implemented by the control device. As a function of these signals, the control device sets the change-speed gearbox to a neutral position. In the neutral position, no gear is engaged in the change-speed gearbox; there is therefore no power-transmitting engagement between an input and an output of the change-speed gearbox.

Before a gear is engaged again and power-transmitting engagement is thus established between a prime mover and driven wheels of the motor vehicle, an appropriate gear ratio and hence a gear to be engaged is selected. Selection is made on the basis of variables that describe the state of the motor vehicle and the environment, and of actuating inputs by the driver of the vehicle, such as, for example:

- speed of the motor vehicle
- acceleration of the motor vehicle
- angle of the accelerator pedal
- rotational speed of the prime mover
- uphill or downhill gradient of the roadway
- straight roadway or a bend.

The selection of the appropriate gear ratio is comparable with the selection of a gear in fully automatic operation of the change-speed gearbox.

Once the optimum gear ratio has been determined, this gear is engaged, and power-transmitting engagement is thus re-established. Before engagement, the rotational speed of the prime mover can be adjusted in such a way, by a request of the control device of the change-speed gearbox to the control device of the prime mover, that there is as small as possible a rotational-speed difference at the gear-change element of the gear to be engaged.

This method allows particularly comfortable operation of the change-speed gearbox. Thanks to the selection of the appropriate gear ratio for engagement, engagement can proceed very smoothly, and unnecessarily large jumps in the rotational speed of the prime mover can be prevented. Moreover, this ensures that engagement of the gear is not immediately followed by a further gear change. This is advantageous especially in the case of change-speed gearboxes with an interruption in tractive effort when changing gear. In addition, large jumps in torque at the driven wheels are prevented, leading to increased driving stability and hence driving safety.

As a refinement of the invention, if a closed-loop control function of the anti-lock control system is present, the change-speed gearbox is set to a neutral position. The necessary information for detection of a closed-loop control function is sent to the control device by the control unit of the anti-lock control system. Once the closed-loop control function has been completed, an appropriate gear ratio is determined and this gear ratio is engaged. It is also possible for an appropriate gear ratio to be determined continuously even during the closed-loop control function, this gear ratio then being engaged immediately on completion of the closed-loop control function.

In the case of a closed-loop control function of the anti-lock control system, a braking force at the vehicle wheels is lowered and raised during a braking operation in such a way that the wheels are prevented from locking up. During this process, vibrations may be excited in a drive line comprising driven wheels, a final drive, a drive shaft, a change-speed gearbox and a prime mover if there is power-transmitting engagement between the prime mover and the driven wheels. This refinement of the invention is particularly comfortable since no vibrations can be excited owing to the neutral position of the gearbox.

As a refinement of the invention, the change-speed gearbox is set to the neutral position after an initial request from the control unit of the anti-lock control system. When power-transmitting engagement is to be re-established, the control unit sends the anti-lock control system an appropriate second request or stops sending the first request. An appropriate gear ratio is then determined, and this gear ratio is engaged. The initial request can take place before or after the start of a closed-loop control function of the anti-lock control system, and the second request can take place before or after the end of the closed-loop control function. This means that the change-speed gearbox is operated in a particularly comfortable manner since the change-speed gearbox can be set to the neutral position even before the closed-loop control function of the anti-lock control system starts, and thus no vibrations can be excited. Moreover, it is possible for the neutral position to be requested only when this is necessary for reasons of comfort or safety.

As a refinement of the invention, before the change-speed gearbox is set to the neutral position, a clutch arranged between the prime mover and the change-speed gearbox is opened and the clutch is closed once the appropriate gear ratio has been engaged. In this case, the clutch can be designed as a single or double clutch. The power-transmitting engagement between the prime mover and the driven wheels can be interrupted in a particularly rapid and jerk-free manner through the opening of the clutch. With the clutch opened, the change-speed gearbox can be set to the neutral position in a jerk-free manner and hence in a particularly comfortable way. Moreover, this can be carried out without imposing a load on the gear-change elements, this increasing the life of the gear-change elements. The same applies mutatis mutandis to the engagement of the gear.

As a refinement of the invention, a torque that can be transmitted by the clutch is reduced as a function of variables that describe the state of the motor vehicle. The torque that can be transmitted is the torque that can be transmitted without slipping of the clutch or slip at the clutch. For example, variables that indicate potential imminent changing of the change-speed gearbox to neutral are evaluated, for example:

gradient of a brake pedal travel
gradient of a pressure in the brake system
vibrations at the wheels and/or axles of the motor vehicle.

If one or more variables exceed certain thresholds, the clutch torque is reduced. If the change-speed gearbox is set to the neutral position in response to a request by the control unit of the anti-lock control system, the torque that can be transmitted can be reduced in the event of a closed-loop control function of the anti-lock control system.

The clutch is opened and the torque that can be transmitted therefore reduced to an extent such that the torque of the prime mover can still be reliably transmitted, for example. Thanks to the partial opening, the clutch can be completely opened more quickly if necessary. The method according to the invention thus acts more rapidly, and particularly comfortable operation of the change-speed gearbox is achieved.

As a refinement of the invention, the method is only carried out if variables that describe the state of the motor vehicle are less than certain limiting values. For example, variables that indicate dynamic operation of the motor vehicle, such as the steering angle
the lateral acceleration of the motor vehicle
the longitudinal acceleration of the motor vehicle
and the yaw rate are evaluated. The method is carried out only if one or more variables are less than certain limiting values.

In the case of dynamic operation of the motor vehicle, re-establishment of power-transmitting engagement between the prime mover and the driven vehicle wheels can lead to instability. Suppressing the implementation of the method in such situations allows particularly safe operation of the motor vehicle.

Other objects, advantages and novel features of the present invention will become apparent from the following detailed description of the invention when considered in conjunction with the accompanying drawings.

BRIEF DESCRIPTION OF THE DRAWINGS

FIG. 3 shows a flow chart of the method according to the invention in a second exemplary embodiment with a reduction in the clutch torque that can be transmitted.

DETAILED DESCRIPTION OF THE DRAWINGS

Figure 1:
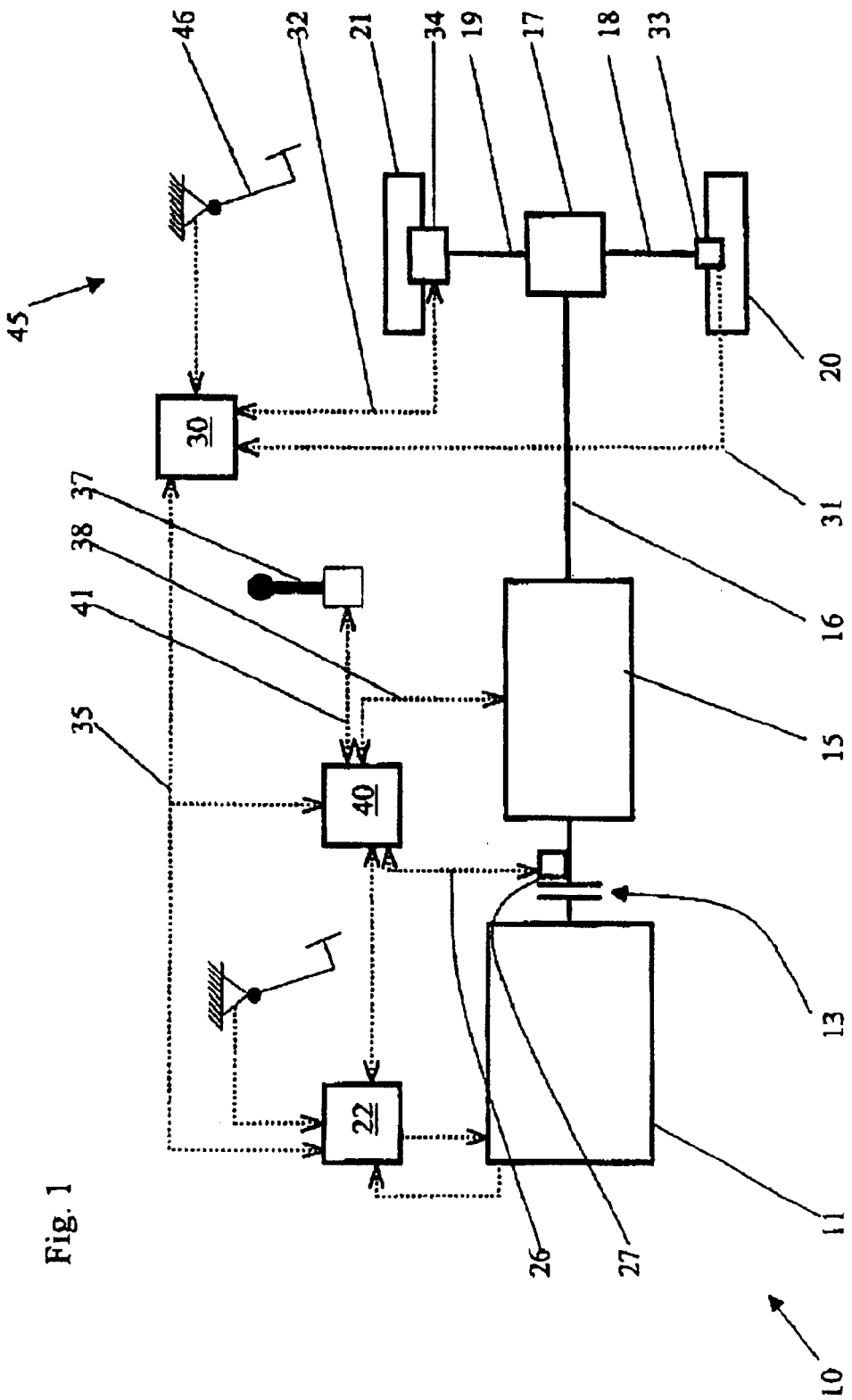
FIG. 1 shows a schematic representation of a drive line of a motor vehicle with a brake system.

According to FIG. 1, a drive line 10 of a motor vehicle has a prime mover 11, which can be coupled to a change-speed gearbox 15 with the aid of a clutch 13 that can be actuated by a clutch-actuating device 27. The converted torque and rotational speed of the prime mover 11 are transmitted via an output shaft (not shown) of the change-speed gearbox 15 by a drive shaft 16 to a final drive 17, which transmits the torque in equal or different proportions to the vehicle wheels 20, 21 via two power-output shafts 18, 19 in a manner known per se.

The prime mover 11 is subjected to open-loop or closed-loop control by a control device 22.

The change-speed gearbox 15 is embodied as a gearbox with shift ratios comprising six forward gears and one reverse gear, in which the gear changes can be carried out by of the actuators (not shown). A gearbox of this kind is generally referred to as an automated manual gearbox. The change-speed gearbox 15 is controlled by a control device 40.

The control device 40 sends actuating signals to the clutch-actuating device 27 via a signal line 26 and receives at least information on a degree of opening of the clutch. This enables the clutch 13 to be opened and closed while being monitored by the control device 40. Using what is referred to as a clutch characteristic, which describes the relationship between the degree of opening and the torque that can be transmitted by the clutch 13, it is thus also possible to determine the torque that can be transmitted by the clutch 13. The control device 40 is connected to a selector lever 37 via a signal line 41 and to sensors and actuators (not shown specifically) of the change-speed gearbox 15 via a signal line 38. A driver of the vehicle can send a gear-change request to the control device 40 with the selector lever 37. From the total amount of information, the control device 40 determines actuating signals for the actuators of the change-speed gearbox 15 and the clutch-actuating device 27 and sends them to the corresponding actuators.

A further control device 30 exercises open-loop or closed-loop control over a brake system 45 and an anti-lock control system. The control device 30 communicates via signals with a brake pedal 46, which is actuated by the driver of the vehicle. The control device 30 detects a position of the brake pedal 46 and, via a signal line 31 from a sensor 33, a measured rotational speed of the wheel 20 and, from these, determines the speed of the motor vehicle. Via a signal line 32, the control device 30 sends actuating signals to a brake-actuating system 34, which converts these actuating signals into a braking torque at the wheel 21. The brake-actuating system 34 feeds back a measured brake pressure to the control device 30. If there is a risk during a braking operation that the wheel 21 will lock up, the control device 30 controls the brake-actuating system 34 in such a way that the brake pressure falls and the wheel 21 continues to rotate. The way in which the anti-lock control system operates corresponds to the commonly known systems for preventing locking up.

At each wheel, the motor vehicle has a brake-actuating system and a rotational-speed sensor, but these are not illustrated for reasons of clarity.

The control devices 22, 30 and 40 are coupled via a data line 35, e.g. a serial CAN bus link, with which the control device 30 can send information, such as the vehicle speed, the status of the anti-lock control system (active/inactive) or requests as regards the actuation of the change-speed gearbox 15, to the control device 40.

Figure 2:
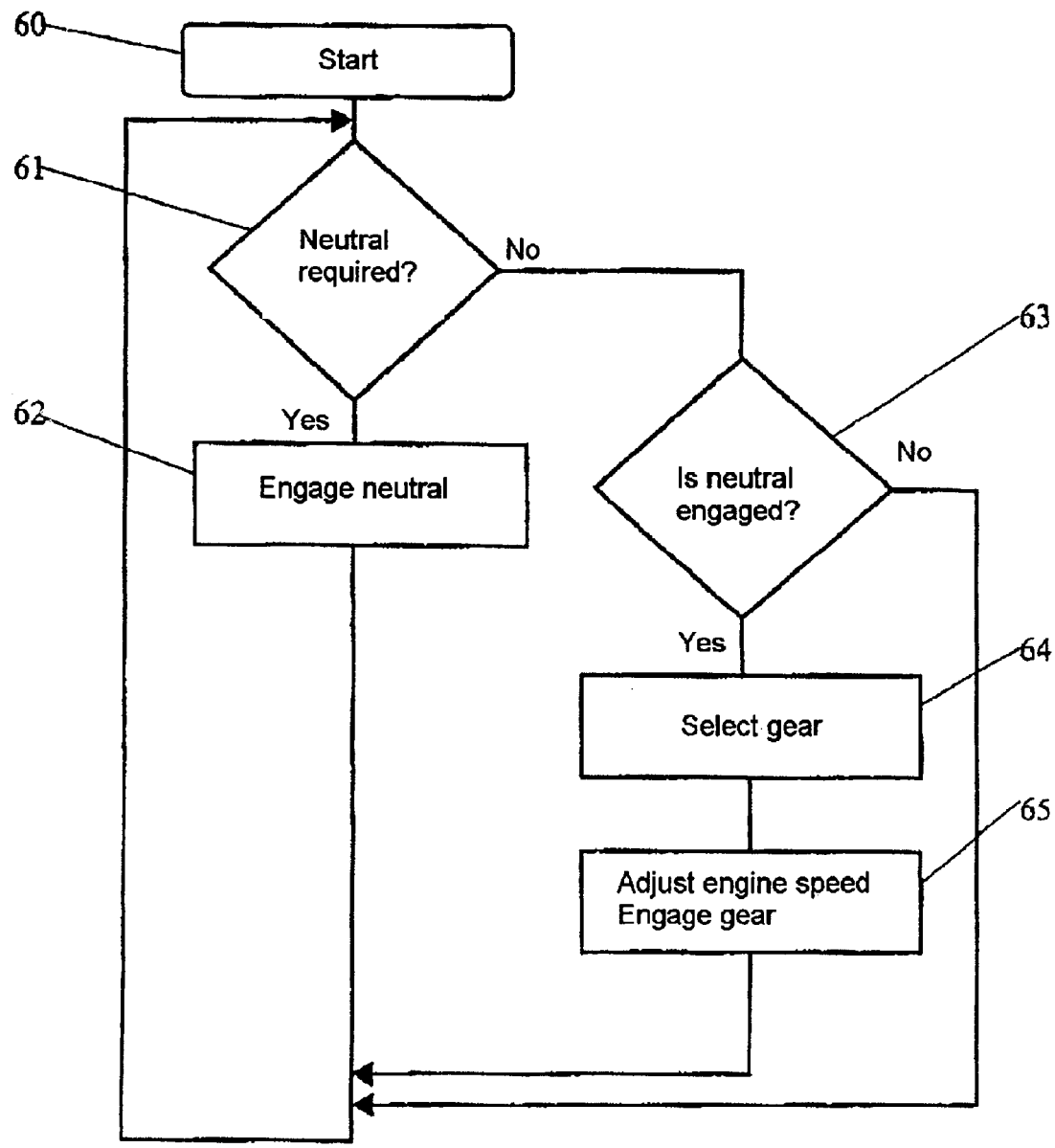
FIG. 2 shows a flow chart of the method according to the invention.

FIG. 2 shows a flow chart of the method according to the invention, which is executed by the control device 40 in FIG. 1. Only the essential operating steps are shown, without taking into account the time required for processing. The method starts in block 60. In the following block 61, the system checks whether the change-speed gearbox 15 should be set to the neutral position or left in the neutral position. The system checks principally whether the anti-lock control system is active. For this purpose, it evaluates a status signal, which is sent to the control device 40 by the control device 30 in FIG. 1. To enable a reliable decision to be made, the system also checks with reference to measured variables whether:

the measured brake pressure is greater than a threshold, the brake pedal has been actuated, the vehicle speed is less than a limiting value, the rotational speed of the prime mover 11 is greater than a threshold, and the control device 22 of the prime mover 11 has detected idling.

If the result of the check is affirmative, the actuators of the change-speed gearbox 15 are controlled in such a way in block 62 that the currently selected gear is disengaged and the change-speed gearbox 15 is hence set to the neutral position. Once block 62 has been executed, the sequence begins again at block 61.

If the result of the check in block 61 is negative, the system checks in block 63 whether the change-speed gearbox 15 was set to the neutral position in the previous pass. If the result of the check is negative, the sequence begins again at block 61.

If the result of the check in block 63 is positive, the appropriate gear is selected in block 64. The selection depends on the state of the motor vehicle, the environmental conditions and actuating inputs by the driver of the vehicle. The gear is also selected when the change-speed gearbox 15 is being operated in semi-automatic mode.

After selection of the gear to be engaged, the rotational speed of the prime mover 11 is set in block 65 to a target speed, which is dependent on the gear to be engaged, the vehicle speed and a type of gear change (upshift during traction or overrun, downshift during traction or overrun). For this purpose, the target rotational speed is sent by the control device 40 to the control device 22, which then sets the speed. Once the rotational speed has been set, the actuators of the change-speed gearbox 15 are controlled in such way that the gear to be engaged is engaged. Once the gear has been engaged, the control device 22 once more implements the commands of the driver of the vehicle. Once block 65 has been executed, the sequence begins again at block 61.

The run through the flow chart is repeated continuously during the operation of the motor vehicle.

FIG. 3 shows a flow chart of the method according to the invention in a second exemplary embodiment. Blocks in which identical or similar steps are carried out to those shown in FIG. 2 are denoted by a reference numeral incremented by 100. For these blocks, the same statements apply as those made with reference to FIG. 2. The method starts in block 160. In the following block 161, the system checks whether the change-speed gearbox 15 should be set to the neutral position or left in the neutral position. For this purpose, the system checks principally whether there is a request for a neutral position of the change-speed gearbox 15 by the control device 30 of the anti-lock control system. On the other hand, the same conditions as in block 61 are checked. In addition, the system checks whether it is permissible to set the change-speed gearbox 15 to the neutral position. For this purpose, it checks whether the steering angle the lateral acceleration of the motor vehicle the longitudinal acceleration of the motor vehicle and the yaw rate are each less than certain limiting values. The result of the check is affirmative only if all the queries have an affirmative result.

If the result of this check is affirmative, the clutch actuating device 27 is controlled in such a way in block 166 that the clutch 13 is opened. In the following block 162, the neutral position is engaged in the change-speed gearbox 15. Once block 162 has been executed, the sequence begins again at block 161.

If the result of the check in block 161 is negative, the system checks in block 167 whether the torque that can be transmitted by the clutch 13 should be reduced and hence whether the clutch should be opened slightly. Variables that indicate potential imminent changing of the change-speed gearbox to neutral are evaluated:

gradient of the brake pedal travel gradient of the pressure in the brake system vibration at the wheels and/or axles of the motor vehicle.

The result of the check is affirmative if one or more variables exceed certain thresholds or the anti-lock control system is active.

If the result of the check is affirmative, the clutch 13 is opened in block 168 to an extent sufficient to ensure that the torque supplied by the prime mover 11 can be reliably transmitted. For this purpose, a torque signal from the control device 22 of the prime mover 11, which is sent to the control device 40 of the change-speed gearbox 15, is compared with the torque that can be transmitted by the clutch 13, which is determined from the degree of actuation and the clutch characteristic. This prevents slip occurring at the clutch 13. Since the torque supplied by the prime mover 11 can change with each pass, the torque that can be transmitted by the clutch is checked in each pass and adapted if necessary. Once block 168 has been executed, the sequence begins again at block 161.

The run through the flow chart is repeated continuously during the operation of the motor vehicle.

If the result of the check in block 167 is negative, operation is normal. This means that there is no need to set the change-speed gearbox 15 to the neutral position or to keep it there or to reduce the torque that can be transmitted by the clutch 13 or to keep it reduced. In this case, the system checks in block 169 whether the torque that it was possible for the clutch 13 to transmit during the previous pass was reduced.

If the result of the check is affirmative, the clutch 13 is completely closed again in block 170.

If the result of the check in block 169 is negative, the system checks in block 163 whether the change-speed gearbox 15 was set to the neutral position in the previous pass. If the result of the check is negative, the sequence begins again at block 161.

If the result of the check in block 163 is affirmative, the appropriate gear is selected in block 164.

After selection of the gear to be engaged, the rotational speed of the prime mover 11 is set and the gear then engaged in block 165.

In the following block 171, the clutch 13 is closed again. The commands of the driver of the vehicle are then implemented once again by the control device 22. Once block 171 has been executed, the sequence begins again at block 161.

The change-speed gearbox can be embodied in such a way that the changes take place with or without an interruption in the tractive effort.

The rotational speed of the prime mover can also be set by the control device for the change-speed gearbox sending a desired value for the torque supplied by the prime mover to the control device of the prime mover, and this value then being set. This means that the closed-loop and/or open-loop control of the rotational speed of the change-speed gearbox is carried out by the control device of the change-speed gearbox.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for operating an automated change-speed gearbox of a motor vehicle using a control device, which communicates via signals with a control unit of an anti-lock control system, the method comprising:

setting the change-speed gearbox to a neutral position as a function of signals from the control unit of the anti-lock control system, and determining an appropriate gear ratio and selecting the determined gear ratio before the change-speed gearbox exits the neutral position.

2. Method according to claim 1, further comprising:

setting the change-speed gearbox to a neutral position if a closed-loop control function of the anti-lock control system is present, and determining an appropriate gear ratio and engaging this gear ratio once the closed-loop control function of the anti-lock control system has been completed.

3. Method according to claim 2, further comprising:

opening a clutch arranged between the prime mover and the change-speed gearbox before the change-speed gearbox is set to the neutral position, and closing the clutch once the appropriate gear ratio is engaged.

4. Method according to claim 3, further comprising reducing a torque that can be transmitted by the clutch as a function of variables that describe the state of the motor vehicle.

5. Method according to claim 1, further comprising, in accordance with a request from the control unit of the anti-lock control system, setting the change-speed gearbox to a neutral position, determining an appropriate gear ratio, and engaging this gear ratio.

6. Method according to claim 3, further comprising:

opening a clutch arranged between the prime mover and the change-speed gearbox before the change-speed gearbox is set to the neutral position, and closing the clutch once the appropriate gear ratio is engaged.

7. Method according to claim 6, further comprising reducing a torque that can be transmitted by the clutch as a function of variables that describe the state of the motor vehicle.

8. Method according to claim 1, further comprising carrying out the steps only as a function of variables that describe the state of the motor vehicle.

9. Method according to claim 8, further comprising carrying out the steps only if variables that describe the state of the motor vehicle are less than certain limiting values.

10. Method according to claim 1, further comprising:

opening a clutch arranged between the prime mover and the change-speed gearbox before the change-speed gearbox is set to the neutral position, and closing the clutch once the appropriate gear ratio is engaged.

11. Method according to claim 10, further comprising reducing a torque that can be transmitted by the clutch as a function of variables that describe the state of the motor vehicle.

12. Apparatus for operating an automated change-speed gearbox of a motor vehicle having a control unit for an anti-lock control system, the apparatus comprising:

a control device which communicates via signals with the control unit of the anti-lock control system, wherein, as a function of signals from the control unit of the anti-lock control system, the change-speed gearbox is set to a neutral position, and wherein an appropriate gear ratio is determined and this gear ratio is selected before the chance-speed gearbox exits the neutral position.

* * * * *